US 6,733,025 B2

(12) United States Patent
Su et al.

(10) Patent No.: US 6,733,025 B2
(45) Date of Patent: May 11, 2004

(54) MOTORCYCLE STAND CONTROL MECHANISM

(76) Inventors: Kuo-Hsin Su, 3/F., No. 212, Chunghsing Rd., Sec. 3, Hsintien City, Taipei County (TW); Paul Huang, 200 Royal Ave., Foster City, CA (US) 94404

( * ) Notice: Subject to any disclaimer, the term of this patent is extended or adjusted under 35 U.S.C. 154(b) by 120 days.

(21) Appl. No.: 10/103,769

(22) Filed: Mar. 25, 2002

(65) Prior Publication Data

US 2003/0178236 A1 Sep. 25, 2003

(51) Int. Cl.$^7$ ................................................. B62H 1/00
(52) U.S. Cl. ........................ 280/293; 180/219; 340/441; 324/207.2
(58) Field of Search .................................. 180/219, 282, 180/271; 280/293, 298; 340/427, 429, 432, 438, 456, 441, 446, 426, 679, 425; 324/207.2, 207.25, 207.26, 165, 167, 174

(56) References Cited

U.S. PATENT DOCUMENTS

| | | | | |
|---|---|---|---|---|
| 4,642,496 A | * | 2/1987 | Kerviel et al. ............. 310/68 B |
| 4,651,845 A | * | 3/1987 | Yagasaki .................... 180/219 |
| 4,976,452 A | * | 12/1990 | Fujita ........................ 280/293 |
| 5,444,369 A | * | 8/1995 | Luetzow ................... 324/207.2 |
| 5,886,349 A | * | 3/1999 | Su .............................. 250/215 |
| 6,016,055 A | * | 1/2000 | Jager et al. ................. 324/165 |
| 6,323,643 B1 | * | 11/2001 | Kordecki ................. 324/207.2 |
| 6,367,337 B1 | * | 4/2002 | Schlabach ............. 73/862.331 |
| 2002/0171538 A1 | * | 11/2002 | Su et al. ..................... 340/441 |

FOREIGN PATENT DOCUMENTS

JP        02095990 A    *   4/1990   ............ B62H/1/02

* cited by examiner

Primary Examiner—Lesley D. Morris
Assistant Examiner—Daniel Yeagley
(74) Attorney, Agent, or Firm—Rosenberg, Klein & Lee

(57) ABSTRACT

A motorcycle stand control mechanism is constructed to include a rotor rotatable with the transmission line of the cable of the mileage meter of the motorcycle in which the motorcycle stand control mechanism is installed, a rotary driven member fixedly fastened to one end of the rotor, the rotary driven member having a plurality of magnets alternatively arranged around the periphery thereof in reversed direction, and a fixedly circuit board provided near one side of the rotary driven member, the circuit board having sensor adapted to act with the magnets and to output a corresponding control signal to turn the motorcycle stand of the motorcycle subject to the status of the rotary driven member.

4 Claims, 12 Drawing Sheets

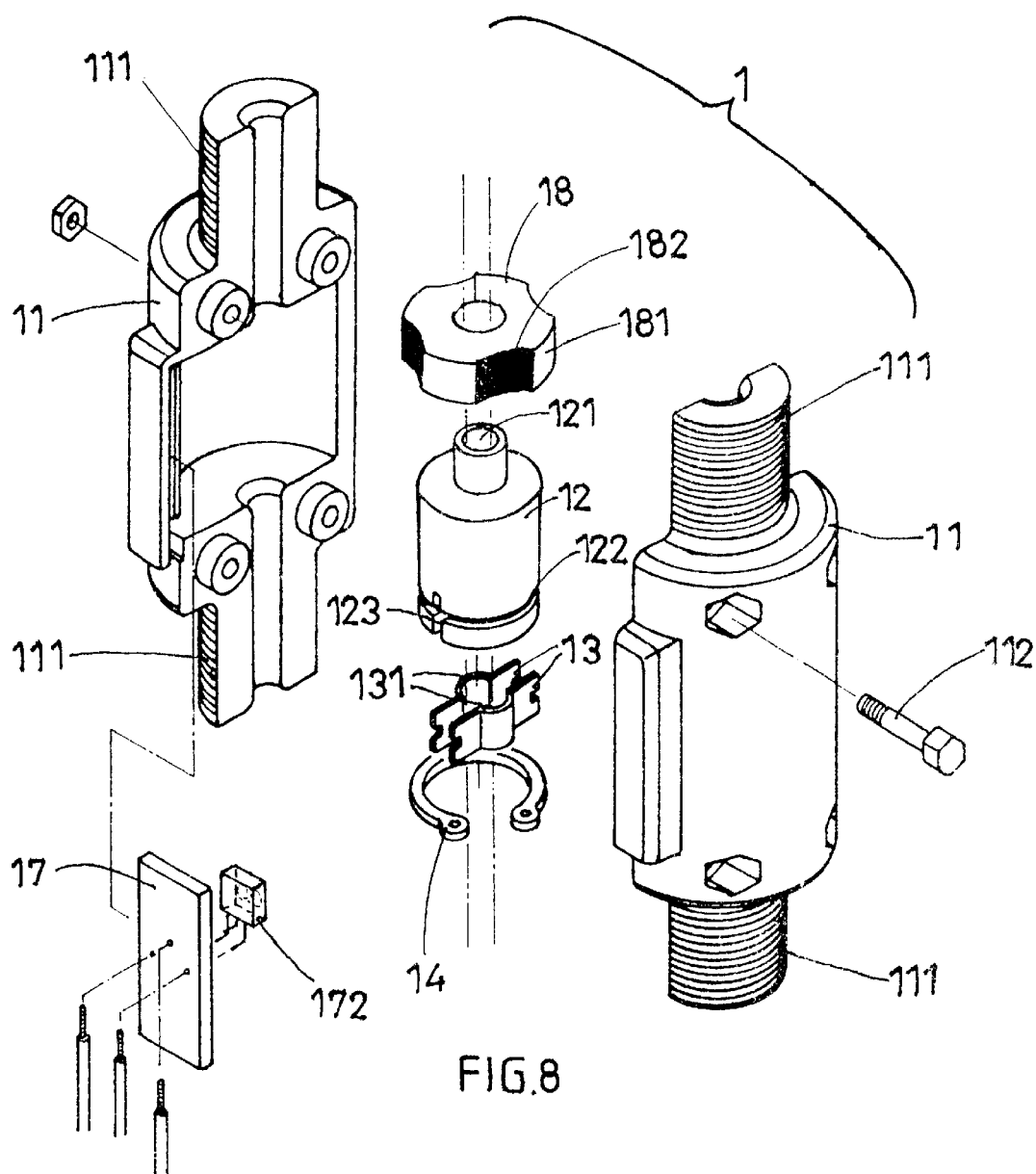
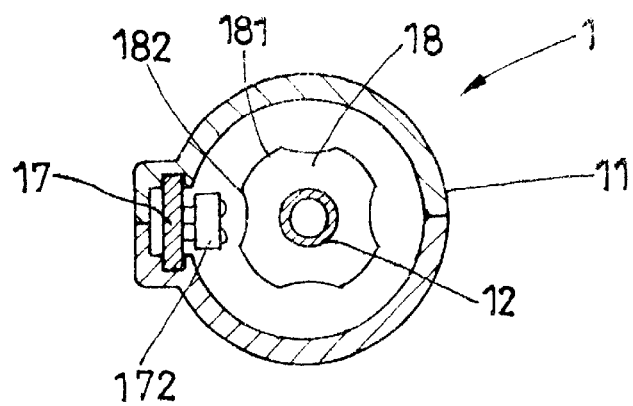

MOTORCYCLE STAND CONTROL MECHANISM

FIELD OF THE INVENTION

The present invention relates to motorcycles and, more specifically to a motorcycle stand control mechanism.

DESCRIPTION OF THE RELATED ART

U.S. Pat. Ser. No. 09/854,565 discloses a vehicle motion detector and control device arrangement, which comprises a casing, a rotor rotated with the transmission line of the cable of the mileage meter of the motor vehicle in the casing, a rotary driven member revolvably supported on a damping oil in an annular end chamber of the rotary member and maintained in the middle position by magnetic expulsive force, and switch means mounted outside the casing and induced by a magnet at the rotary driven member to turn on a control device of the motor vehicle upon operation of the motor vehicle.

SUMMARY OF THE INVENTION

The present invention provides a motorcycle stand control mechanism, which eliminates the use of damping oil. According to one aspect of the present invention, the motorcycle stand control mechanism comprises a rotor rotatable with the transmission line of the cable of the mileage meter of the motorcycle in which the motorcycle stand control mechanism is installed, a rotary driven member fixedly fastened to one end of the rotor, the rotary driven member having a plurality of magnets alternatively arranged around the periphery thereof in reversed direction, and a fixedly circuit board provided near one side of the rotary driven member, the circuit board having sensor means adapted to act with the magnets and to output a corresponding control signal to turn the motorcycle stand of the motorcycle subject to the status of the rotary driven member. According to another aspect of the present invention, the sensor means can be a Hall transistor or solenoid switch. In another embodiment of the present invention, the rotary driven member is made having reflective and non-reflective faces alternatively arranged around the periphery, and the sensor of the circuit board is a photosensitive transistor adapted to act with the reflective faces of the rotary driven member. In still another embodiment of the present invention, the rotary driven member is made having inductive and non-inductive faces alternatively arranged around the periphery, and the sensor of the circuit board is a proximity switch adapted to act with the reflective faces of the rotary driven member.

BRIEF DESCRIPTION OF THE DRAWINGS

FIG. 5-1 is an assembly view of the motor-driven motorcycle stand assembly according to the present invention.

FIG. 5-2 is a sectional view in an enlarged scale of the motor-driven motorcycle stand assembly according to the present invention.

FIG. 5-3 is another sectional view in an enlarged scale of the motor-driven motorcycle stand assembly according to the present invention.

FIG. 8 is an exploded view of another alternate form of the vehicle motion detector according to the present invention.

FIG. 9 is a cross sectional view of the assembly of the vehicle motion detector shown in FIG. 8.

DETAILED DESCRIPTION OF THE PREFERRED EMBODIMENT

Figure 4:
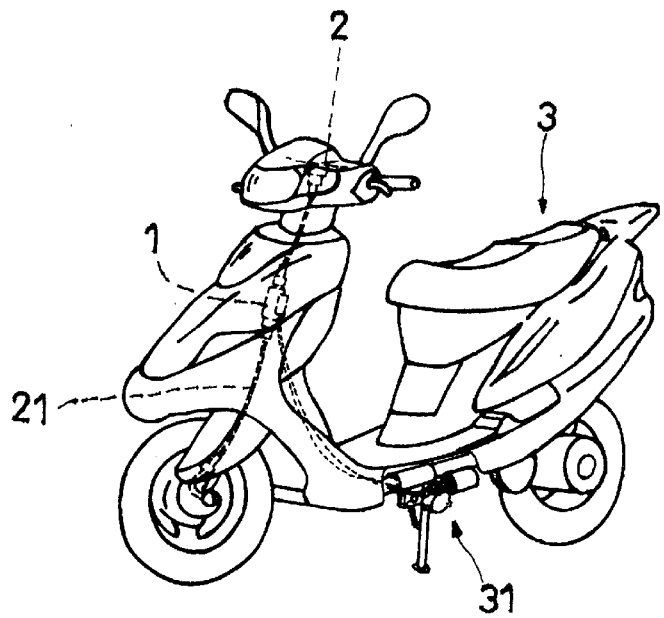
FIG. 4 illustrates an application example of the motorcycle stand control mechanism according to the present invention.

Referring to FIGS. from 1 through 4, a vehicle motion detector 1 is shown comprised of a casing 11, a rotor 12, a rotary driven member 15, and a circuit board 16. The casing 11 is formed of two symmetrical half shells fixedly fastened together by screw bolts 112, comprising two threaded necks 111 at two distal ends onto which two screw caps are respectively threaded to secure two sleeves 21 i.e. cable jacket to the casing 11, enabling the transmission line 22 of the cable of the vehicle mileage meter 2 to be inserted through the sleeves 21 and the casing 11 (see FIG. 4). The rotor 12 is mounted in the casing 11, comprising an axial hole 121, an outside annular groove 122 around the periphery, and two bottom notches 123. The rotary driven member 15 is coaxially mounted on one end of the rotor 12 inside the casing 11, having a plurality of magnets 151 alternatively arranged around the periphery in reversed directions. The transmission line 22 of the cable of the mileage meter 2 is inserted through the axial hole 121 of the rotor 12. Two clamping plates 13 are respectively mounted in the bottom notches 123 of the rotor 12 to hold the transmission line 22. The clamping plates 13 each have a clamping portion 131 of smoothly arched cross section respectively clamped on the transmission line 22. A C-shaped clamp 14 is fastened to an outside annular groove 122 of the rotor 12 to fixedly secure the clamping plates 13, the transmission line 22. and the rotor 12 together. During running of the vehicle, the rotor 12 is rotated with the transmission line 22 of the cable of the mileage meter 2, and the rotary driven member 15 is rotated with the rotor 12. The circuit board 16 is disposed at one side of the casing 11, comprising a Hall transistor 161 adapted to act with the magnets 151 of the rotary driven member 15. The Hall transistor 161 has two opposite terminals respectively connected to a control device of the vehicle by electric wires 162. When the rotor 12 rotated, the Hall transistor 161 is induced by the magnets 151 of the rotary driven member 15, and outputs a corresponding signal to the control device of the vehicle through the electric wires 162. When the rotor 12 stopped, the Hall transistor 161 receives no signal, and outputs another corresponding signal to the control device of the vehicle.

Referring to FIGS. 4, 5, 5-1, 5-2, and 5-3, the vehicle motion detector 1 can be used to control the motor-driven motorcycle stand assembly 31 of a motorcycle 3. The motor-driven motorcycle stand assembly 31 comprises a bracket 4 holding a holder 311. The holder 311 holds a motor 316. The motor 316 has a gear 315 fixedly mounted on the output shaft thereof. An axle 312 is inserted through the holder 311, having one end revolvably supported on an axle bearing (not shown) at a cap 35 at one side of the holder 311. A gear 314 is mounted on the axle 312 and meshed with the gear 315 at the output shaft of the motor 316. An actuating screw 3122 is fixedly fastened to a middle part of the axle 312. Two limit stitches 3121 are mounted in the holder 311 and spaced from the actuating screw 312 at two sides. When the engine of the motorcycle 3 started, the transmission line 22 is rotated to trigger the vehicle motion detector 1, causing the vehicle motion detector 1 to turn on the motor 316. When the motor 316 started, the actuating screw 3122 is turned with the axle 312 to touch one limit switch 3121, thereby causing the motorcycle stand 313 to be lifted from the operative position to the non-operative position. An arm 34 is provided having one end fixedly fastened to one end of the axle 312 and an opposite end connected to a side rod on the middle of the motorcycle stand 313 through a tensile spring 33. When the motorcycle 3 stopped, the circuit board 16 of the vehicle motion detector 1 starts the motor 316 to turn the axle 312 in one direction, thereby causing the arm 34 to be rotated with the axle 312 to pull the motorcycle stand 313 from the non-operative position to the operative position to support the motorcycle 3 on the ground. After the motorcycle stand 313 has been lowered from the non-operative position to the operative position, the actuating screw 3122 triggers the other limit switch 3121 to cut off power supply from the motor 316. Further, a bushing 32 is sleeved onto the axle 312 and mounted in a pivot hole 3131 at one end of the motorcycle stand 313, for enabling the motorcycle stand 313 to be turned about the bushing 32 between the operative position and the non-operative position.

Figure 6:
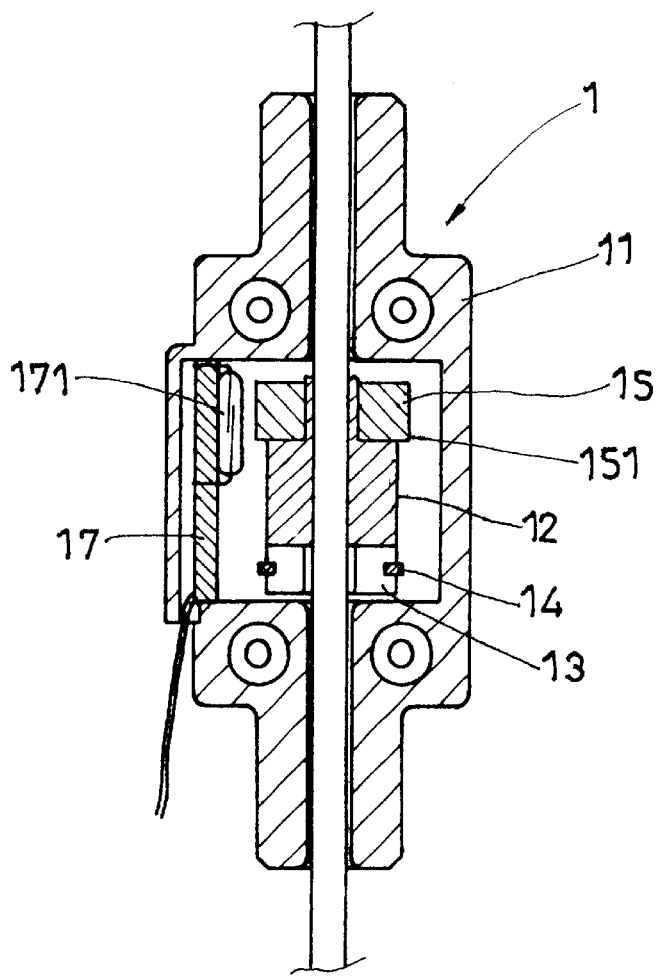
FIG. 6 is a longitudinal view in section of an alternate form of the vehicle motion detector according to the present invention.
Figure 7:
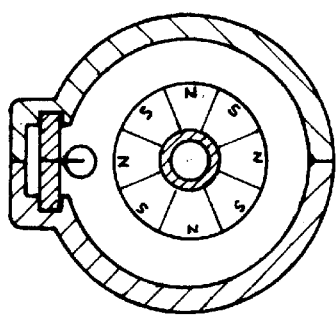
FIG. 7 is a cross sectional view of FIG. 6.

FIGS. 6 and 7 show an alternate form of the vehicle motion detector 1. According to this alternate form, a circuit board 17 is disposed at one side of the casing 11 instead of the aforesaid circuit board 16. The circuit 17 comprises a solenoid switch 171 adapted to act with the magnets 151 of the rotary driven member 15. When the rotary driven member 15 rotated, the solenoid switch 171 is induced to output a corresponding signal.

FIGS. 8 and 9 show another alternate form of the vehicle motion detector 1. According to this alternate form, the circuit board, referenced by 17, comprises a photosensitive transistor 172 adapted to act with the rotary driven member, referenced by 18. The rotary driven member 18 comprises a plurality of reflective faces 181 and non-reflective faces 182 alternatively arranged around the periphery. When the rotary driven member 18 rotated, the photosensitive transistor 172 detects the direction and amount of motion of the rotary driven member 18.

Figure 10:
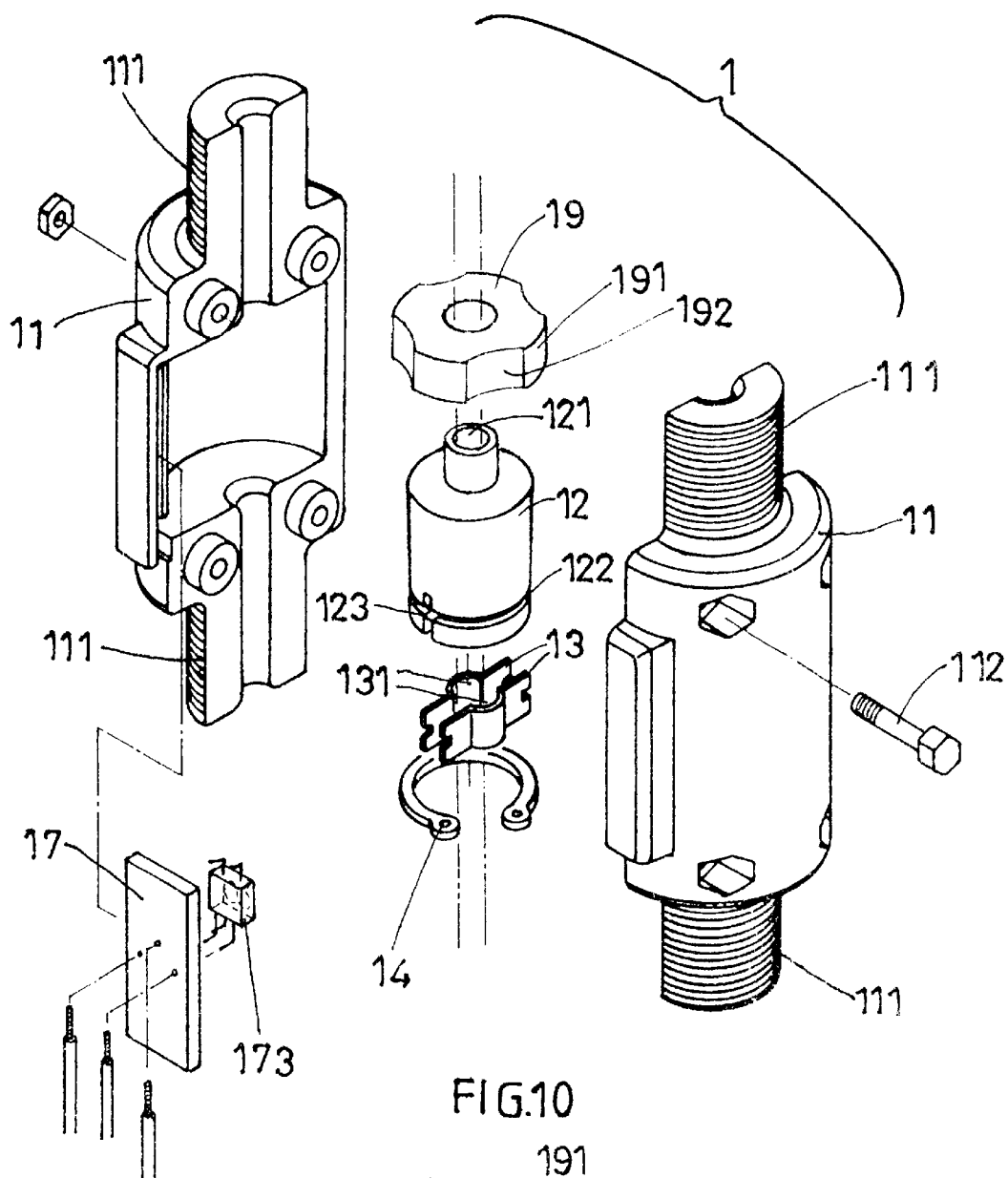
FIG. 10 is an exploded view of still another alternate form of the vehicle motion detector according to the present invention.
Figure 11:
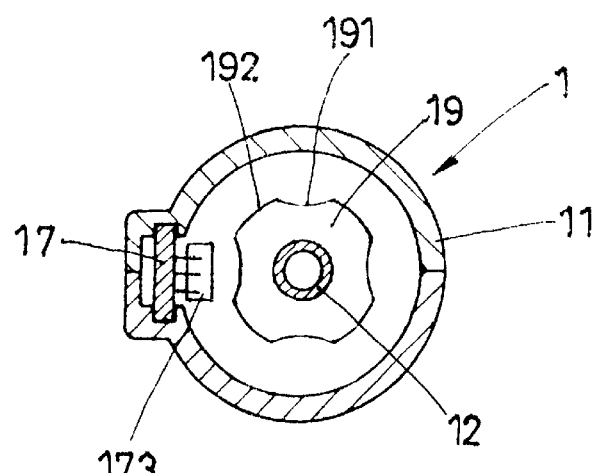
FIG. 11 is a cross sectional view of the assembly of the vehicle motion detector shown in FIG. 10.

FIGS. 10 and 11 show still another alternate form of the vehicle motion detector 1. According to this alternate form, the circuit board 17 comprises a proximity switch 173; the rotary driven member, referenced by 19, comprises a plurality of inductive faces 191 and non-inductive faces 192 alternatively arranged around the periphery. When the rotary driven member 19 rotated with the rotor 12, the proximity switch 173 detects the direction and amount of motion of the rotary driven member 19.

Figure 12:
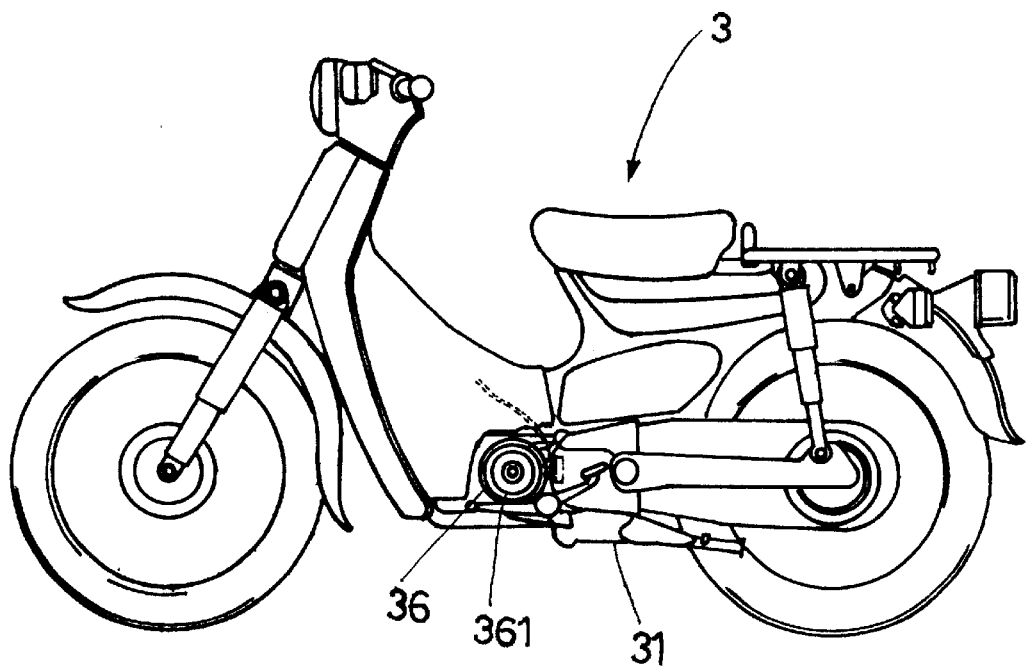
FIG. 12 shows another application example of the present invention.
Figure 13:
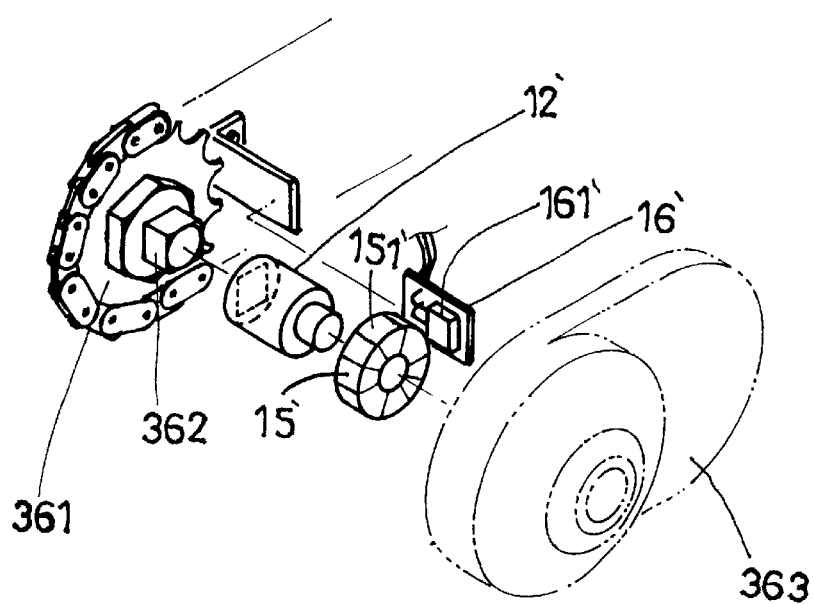
FIG. 13 is an exploded view in an enlarged scale of a part of FIG. 12.

FIGS. 12 and 13 show another application example of the present invention. As illustrated, the power output shaft 362 of the power output gear wheel 361 of the engine 36 of the motorcycle 3 is fixedly mounted with a rotor 12'. A rotary driven member 15' is fastened to one end of the rotor 12', having a plurality of magnets 151' alternatively arranged around the periphery in reversed directions. A circuit board 16' is provided near one side of the rotary driven member 15', comprising a Hall transistor 161' adapted to act with the magnets 151' of the rotary driven member 15'. When the engine 36 of the motorcycle 3 started, the rotary driven member 15' and the rotor 12' are rotated with the power output shaft 362 of the power output gear wheel 361 of the engine 36 to induce the Hall transistor 161', thereby causing the circuit board 16' to controls the motorcycle stand 313.

Figure 14:
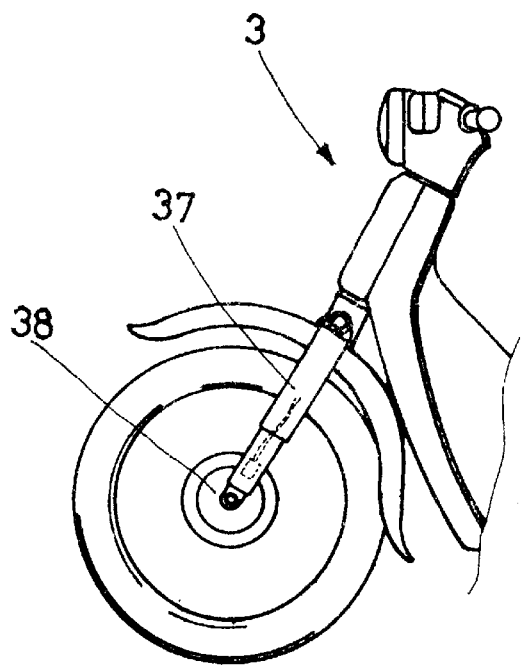
FIG. 14 shows still another application example of the present invention.
Figure 15:
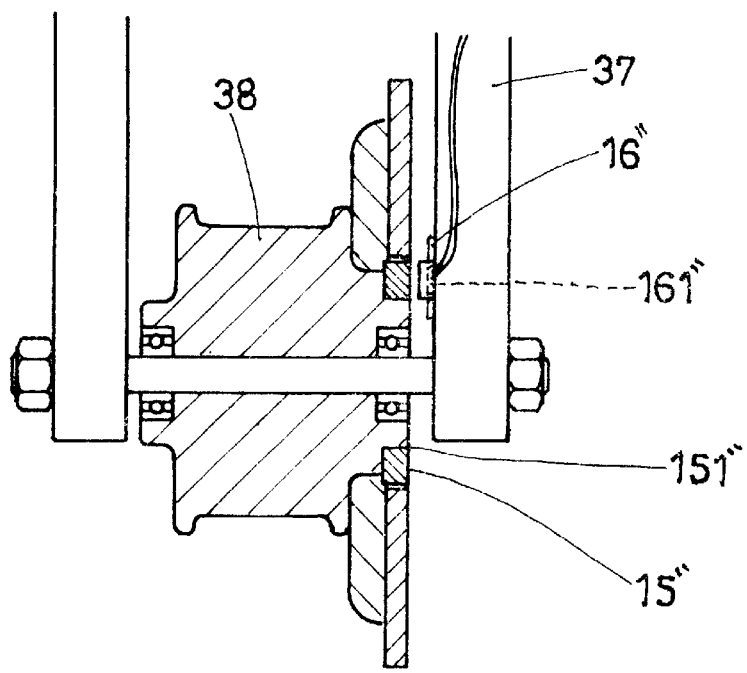
FIG. 15 is a sectional view in an enlarged scale of a part of FIG. 14.

FIGS. 14 and 15 show still another application example of the present invention. As illustrated, an annular rotary driven member 15" is installed in one side of the hub 38 of the front wheel of the motorcycle 3, having a plurality of magnets 151" alternatively arranged around the periphery in reversed directions; a circuit board 16" is installed in the front shock-absorber 37 of the motorcycle 3, having a Hall transistor 161" facing the magnets 151" of the rotary driven member 15". When the hub 38 of the front wheel of the motorcycle 3 rotated, the Hall transistor 361" is induced to output a corresponding signal, causing the circuit board 16 to work.

In the aforesaid embodiments, the Hall transistor 161;161';161", the solenoid switch 171, the photosensitive transistor 172, or the proximity switch 173 acts with the magnets 151;151';151", reflective faces 181 or inductive faces 191 of the rotary driven member 15, 15', 15", 18 or 19 to detect the direction and amount of rotary motion of the rotary driven member 15, 15', 15", 18 or 19 and to output a corresponding signal to a control device, causing the control device to work.

Figure 1:
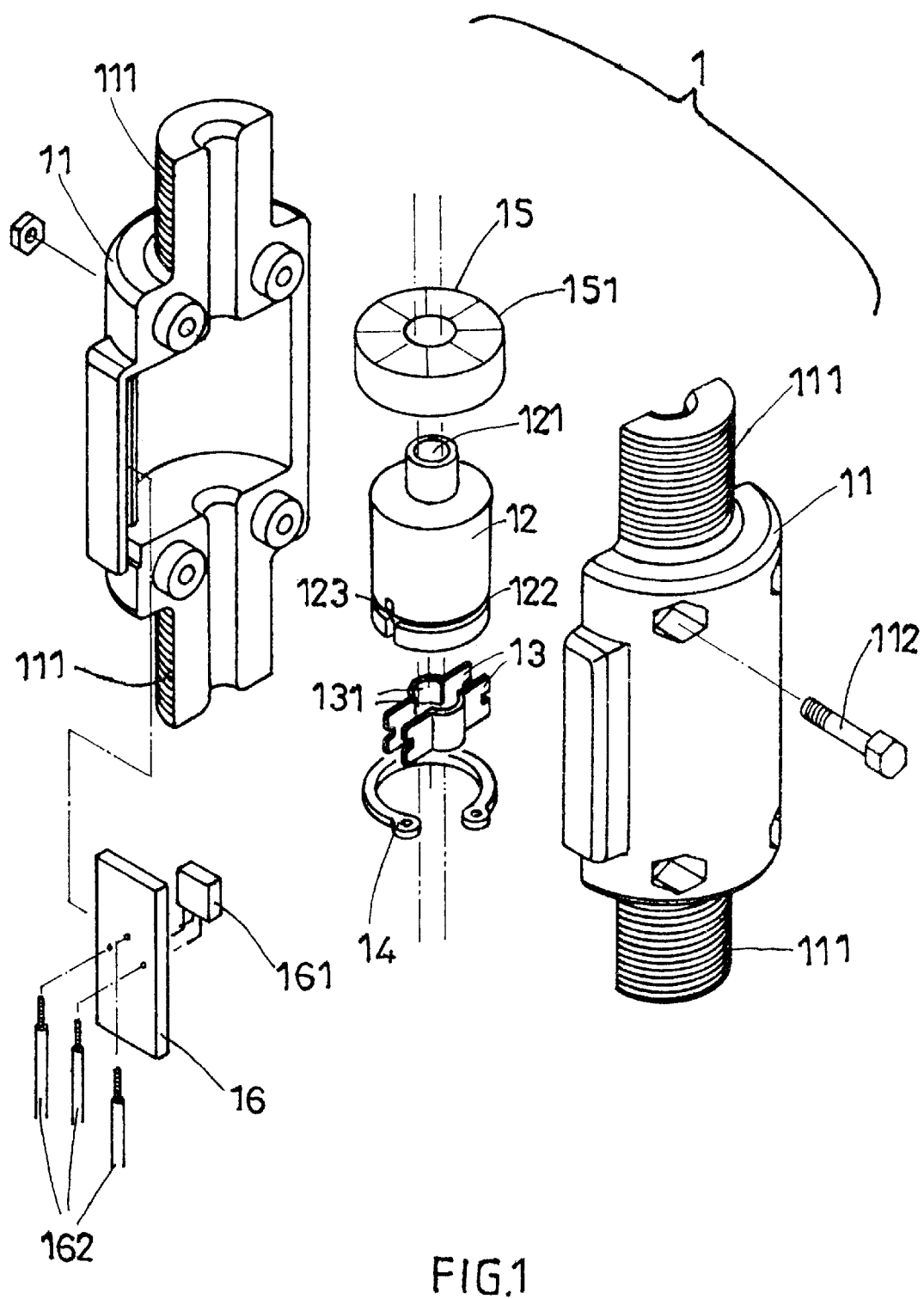
FIG. 1 is an exploded view of a vehicle motion detector for a motorcycle stand control mechanism according to the present invention.
Figure 2:
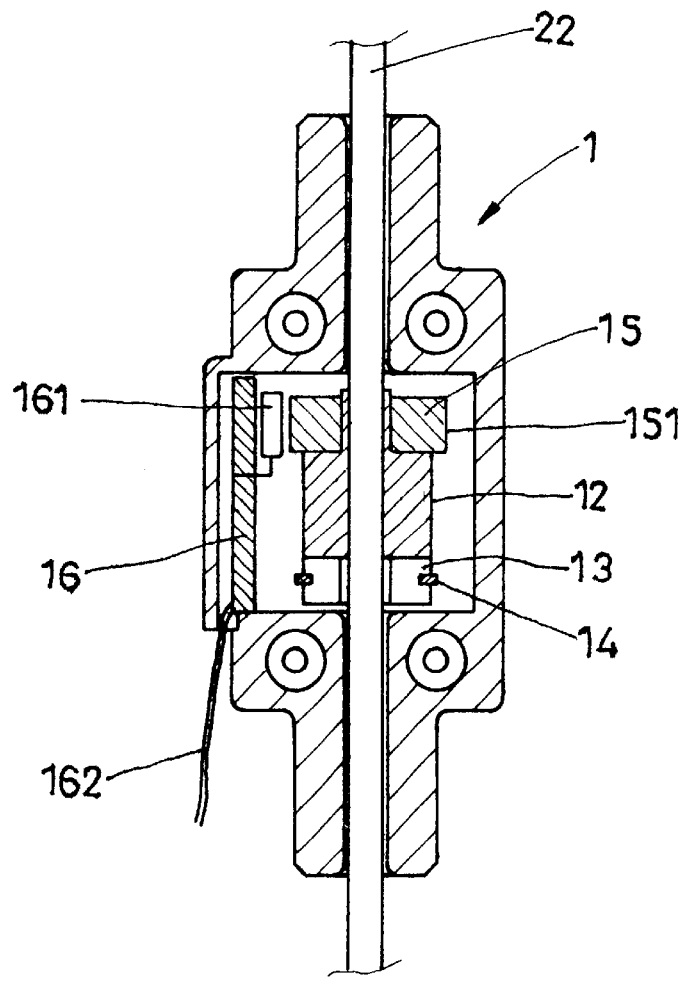
FIG. 2 is a longitudinal view in section of the vehicle motion detector according to the present invention.
Figure 3:
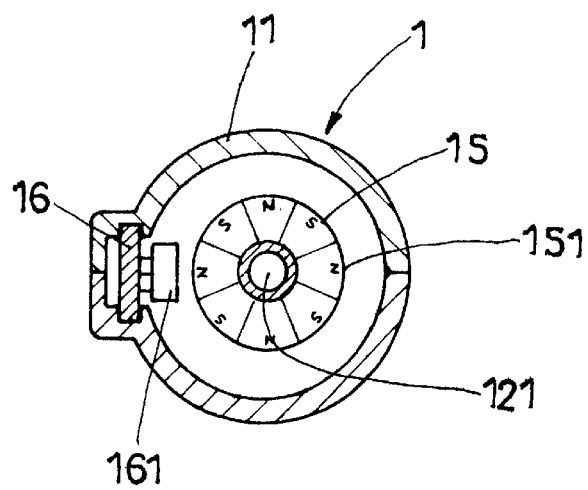
FIG. 3 is a cross sectional view of the vehicle motion detector according to the present invention.
Figures 1, 5:
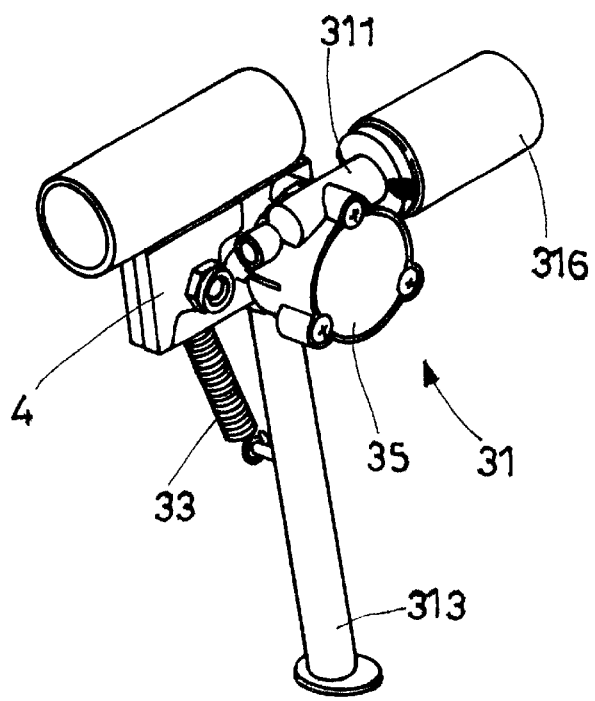
FIG. 5 is an exploded view of a motor-driven motorcycle stand assembly for the motorcycle stand control mechanism according to the present invention.
Figure 5:
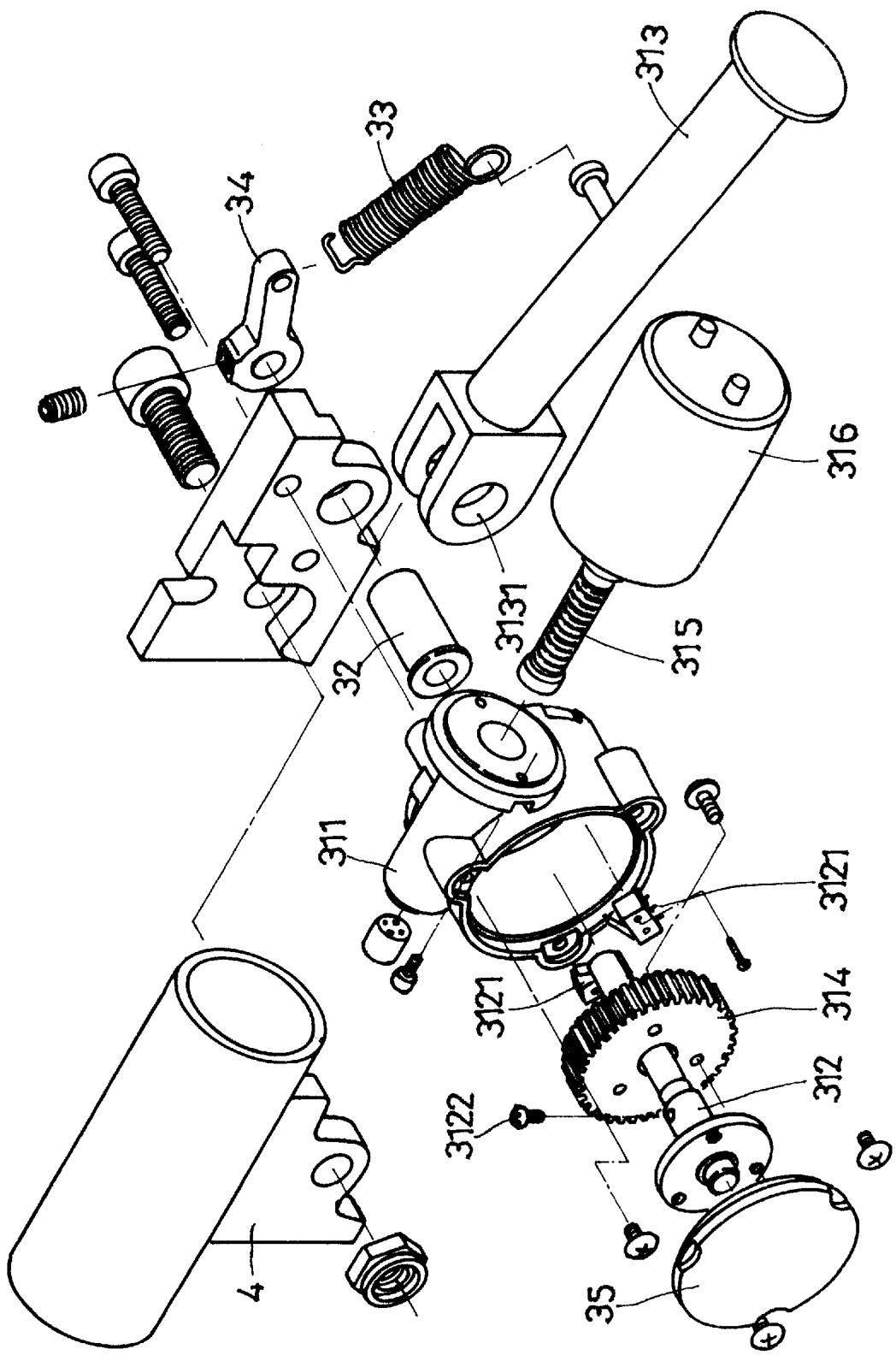
Figures 2, 5:
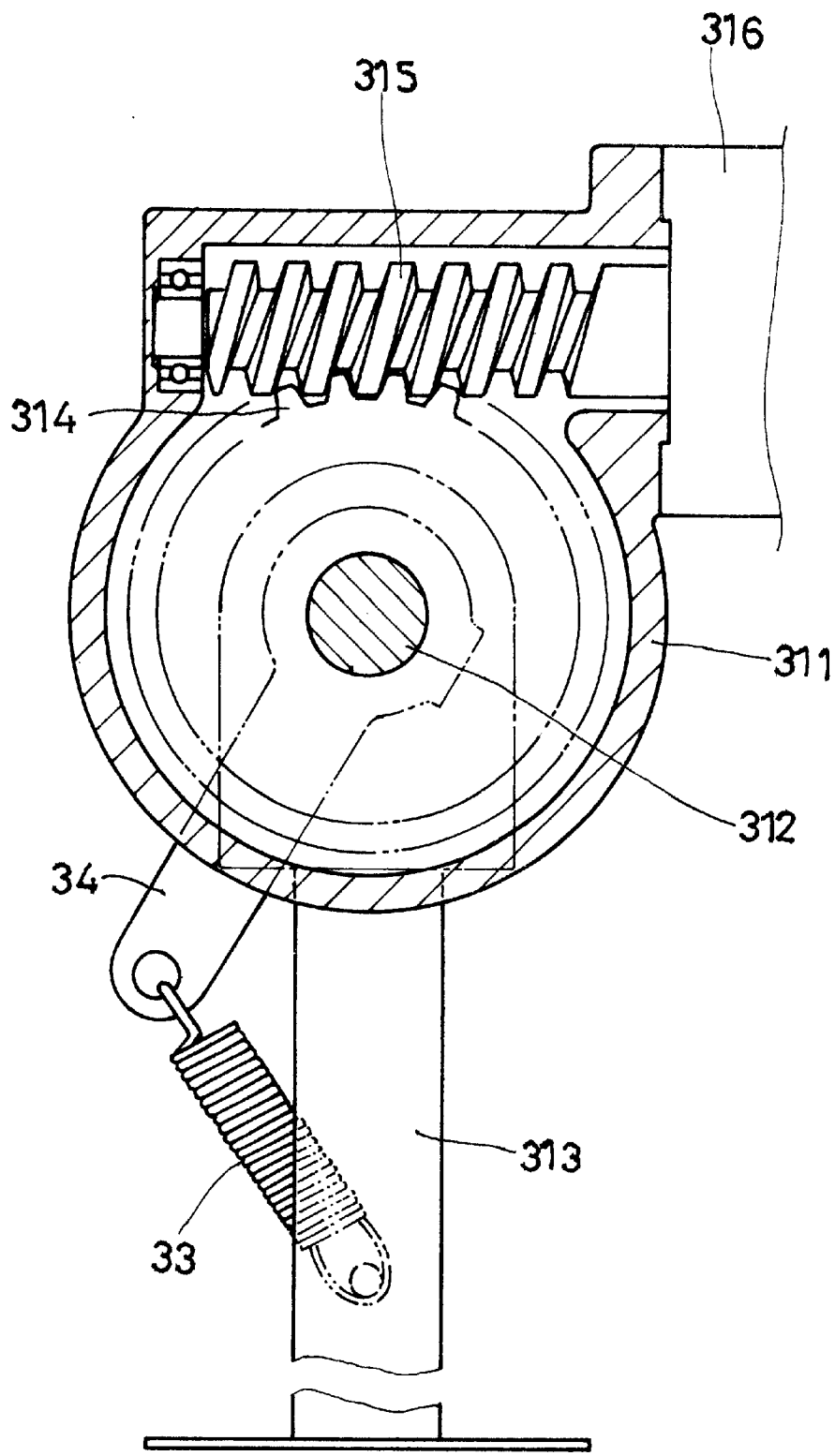
Figures 3, 5:
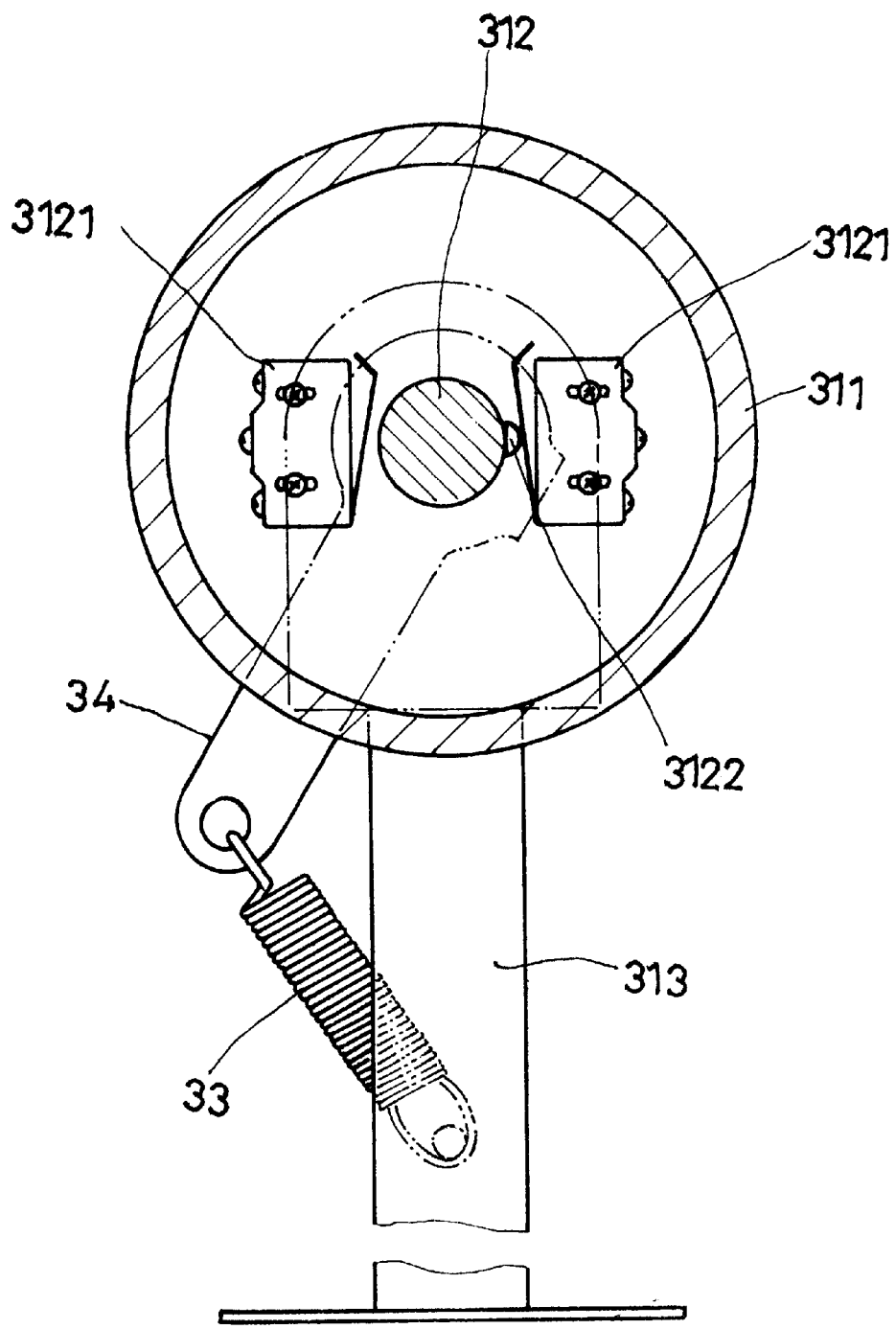
Figure 16:
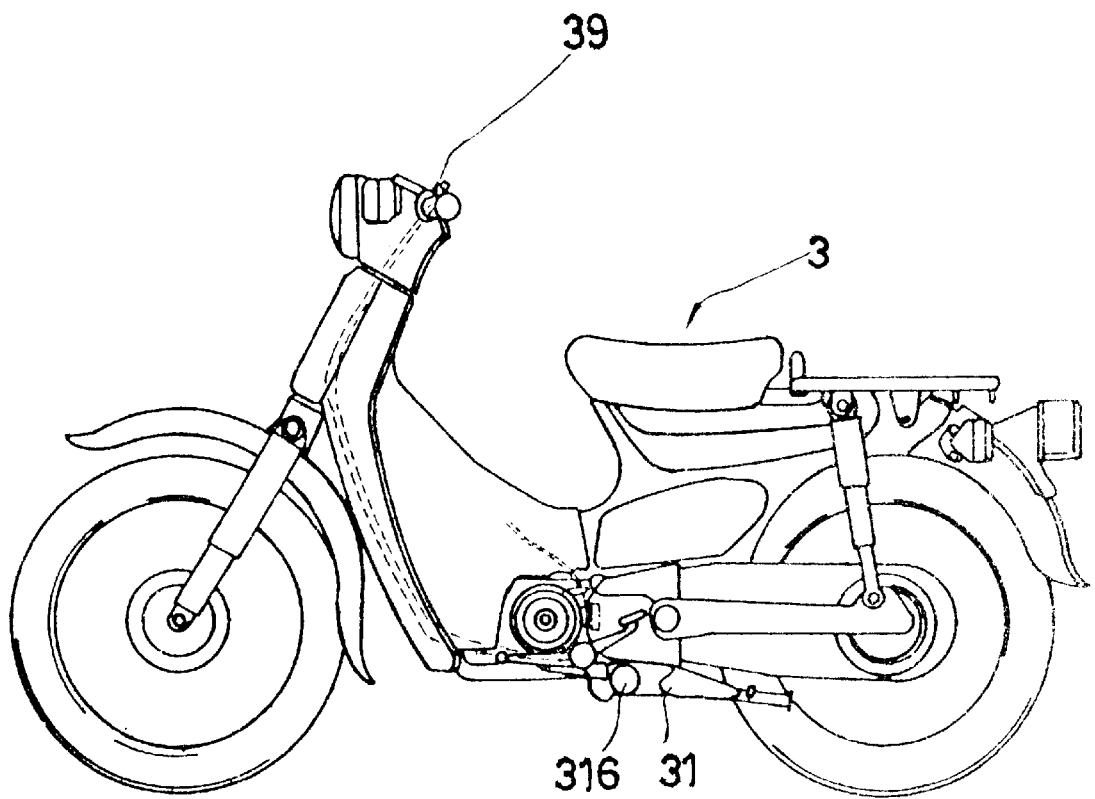
FIG. 16 shows still another application of the present invention.

Referring to FIG. 16 and FIG. 5-3, a control switch 39 is installed in the motorcycle 3 for directly controlling the operation of the motor 316 to turn the motorcycle stand 313 of the motorcycle stand assembly 31 between the operative position and the non-operative position. When the motorcycle stand 313 turned to the operative or non-operative position, the actuating screw 3122 triggers one of the limit switches 3121 to cut off power supply from the motor 316.

A prototype of motorcycle stand control mechanism has been constructed with the features of FIGS. 1~16. The motorcycle stand control mechanism functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A motorcycle stand control mechanism comprising:
   a vehicle motion detector installed in a motorcycle, said vehicle motion detector comprising a casing, said casing comprising two threaded necks at two distal ends, two screw caps respectively threaded onto said threaded necks to secure two sleeves to said casing, a transmission line inserted through said sleeves and said casing and connected to a vehicle mileage meter of the motorcycle, a rotor mounted in said casing for synchronous rotation with said transmission line, said rotor comprising an axial hole, which receives said transmission line, an outside annular groove around the periphery thereof, and two bottom notches, a rotary driven member fixedly mounted on one end of said rotor inside said casing around said transmission line, said rotary driven member having a plurality of magnets alternatively arranged around the periphery thereof in reversed directions, two clamping plates respectively mounted in said bottom notches of said rotor and clamped on said transmission line, a C-shaped clamp fastened to the outside annular groove of said rotor to fixedly secure said clamping plates, said transmission line and said rotor together, and a circuit board disposed near one side of said casing, said circuit board comprising sensor means adapted to act with the magnets of said rotary driven member; and a motor-driven motorcycle stand installed in the motorcycle in which said vehicle motion detector is installed, and controlled to move between the operative position and the non-operative position;

wherein when the motorcycle started, said transmission line is rotated with the mileage meter of the motorcycle, and said rotary driven member is rotated with said rotor to induce said sensor, causing said sensor means to output a first control signal to turn said motor-driven motorcycle stand from the operative position to the non-operative position; when the motorcycle stopped, said rotor and said rotary driven member are stopped, and said sensor means receives no signal from said rotary driven member, thereby causing said sensor means to output a second control signal to turn said motor-driven motorcycle stand from the non-operative position to the operative position.

2. The motorcycle stand control mechanism as claimed in claim 1 wherein said motor-driven motorcycle stand comprises a bracket fixedly fastened to a frame of the motorcycle in which said vehicle motion detector is installed, a holder mounted on said bracket, a motor mounted on said holder and electrically connected to said circuit board and controlled to operate by said sensor means, an axle mounted in said holder, a drive gear coupled to said motor, a driven gear fixedly mounted on said axle and meshed with said drive gear for enabling said axle to be rotated upon operation of said motor, a bushing sleeved onto said axle, a stand pivoted to said bushing, an arm, said arm having one end fixedly fastened to one end of said axle and an opposite end connected to a part of said stand by a tensile spring, two limit switches mounted in said holder and adapted to control forward/backward rotation of said motor, and an actuating screw fixedly mounted on said axle and turned with said axle to touch said limit switches alternatively.

3. The motorcycle stand control mechanism as claimed in claim 1 wherein said sensor means is a Hall transistor.

4. The motorcycle stand control mechanism as claimed in claim 1, wherein said sensor means is a solenoid switch.

* * * * *